Figure 1:
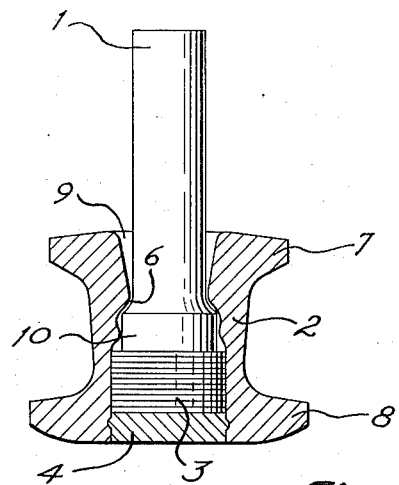

United States Patent [19]
Loqvist

[11] 3,786,849
[45] Jan. 22, 1974

[54] TYRE STUD
[75] Inventor: Kaj-Ragnar Loqvist, Fagersta, Sweden
[73] Assignee: Fagersta Aktiebolag, Fagersta, Sweden
[22] Filed: Apr. 5, 1972
[21] Appl. No.: 241,341

[30] Foreign Application Priority Data
Apr. 20, 1971 Sweden.............................. 5084/71

[52] U.S. Cl. ............................................. 152/210
[51] Int. Cl. .......................................... B60c 11/16
[58] Field of Search .................................... 152/210

[56] References Cited
UNITED STATES PATENTS
2,627,888  2/1953  Bull.................................... 152/210
3,407,861  10/1968  Hildebrant.......................... 152/210
1,046,969  12/1912  Chaloner ............................ 152/210

Primary Examiner—Gerald M. Forlenza
Assistant Examiner—D. W. Keen
Attorney, Agent, or Firm—J. H. Slough et al.

[57]  ABSTRACT

There is disclosed herein a tyre stud structure comprising a body portion for insertion in a vehicle tyre and a stud pin mounted in the body for limited axial movement in the radial direction with respect to the tyre. Means are provided for resiliently urging the pin outwardly, and in a modification, the outwardly projecting portion of the pin has a sleeve positioned thereover.

8 Claims, 2 Drawing Figures

PATENTED JAN 22 1974     3,786,849

TYRE STUD

The present invention refers to an anti-skid tyre stud for vehicles comprising a stud body and a stud pin, said pin being movably mounted in the stud body in the radial direction of the tyre.

Tyre studs of common design have a pin of cemented carbide as working part and a body of steel or plastic as holding part. Because of the heavy weight of the common studs, about 1.5 to 2.5 g, and their relatively rigid attachment to the tyre the working part exerts a high pressure against the road surface.

In all cases of mechanical wear the magnitude of the specific pressure against the bed determines the extent of wear. As to tyre studs the impact they exert against the road surface must be added. The impact energy increases in proportion to the square of the velocity. In the light of these facts it is obvious that the mechanism of road wear from tyre studs is substantially of the pure scratching and striking type. The first mentioned type of wear is caused by the rigid attachment of the stud and the second type of wear is caused by the heavy weight of the stud in combination with the low impact resistance of the road material.

The present invention is characterized in that the end of the stud pin facing the tyre centre rests against a separate cushion of rubber or similar elastic material, said cushion being received in a central throughhole in the stud body.

The stud pin should have such a resistance against movement inwards that the crushing strength of ice is exceeded. This is attained by matching the stiffness of the rubber cushion. The object of the stud body is to keep the stud pin in position against coaxial forces when, e.g., skidding and to prevent the pin from moving too far outwards from the tyre.

Owing to the stud body taking no part in the pin movement the weight of the moving part can be reduced by five to 10 times depending on stud design. The reduction of impact against the road surface and the reduction of the specific pressure exerted by the stud after it has hit the road surface results in the following advantages in comparison with conventional studs:

a. Reduced wear on road surface,
 b. reduced wear on stud pin,
 c. lower noise level in car and
 d. better road grip.

The better road grip according to point (d) might seem unexpected. However the tip of a conventional stud is worn in such a manner that it gets rounded edges and thus gives a poorer road grip. On the contrary the movably mounted stud according to the invention is worn out more or less even across the plane of the stud tip because the stud pin is pushed into the tyre when load increases.

Figure 2:
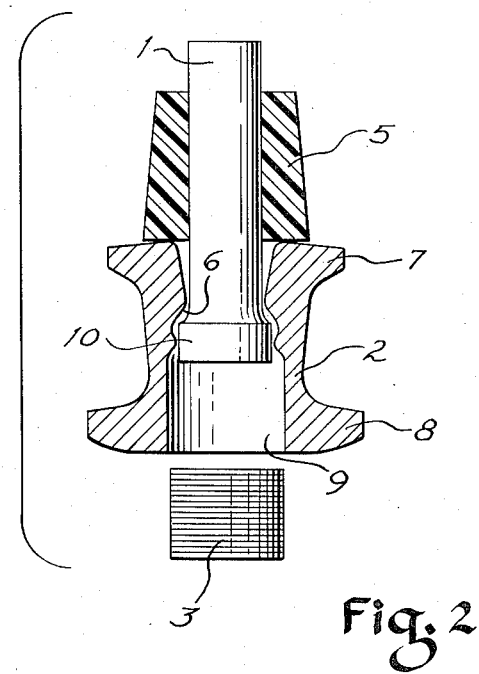

The invention is described in detail in the following specification with reference to the attached drawing on which FIGS. 1 and 2 illustrate two different embodiments of a stud according to the invention. FIG. 1 shows an embodiment of the invention wherein the stud pin base is engaged by a cushion mounted within the the stud body, abutting, at its other end a support base. FIG. 2 shows another embodiment of the invention in which the support base is omitted. Corresponding parts of the two embodiments of the studs as shown on the drawing have the same reference numerals.

The stud according to the invention as illustrated in FIG. 1 comprises a pin 1, a stud body 2, a cushion 3 of elastic material, such as rubber, and a support plate 4 of a rigid material, e.g., steel. The pin 1 may consist of cemented carbide, and stud body 2 may be made from steel or cemented carbide. The pin 1, the cushion 3 and the plate 4 are received in an axial through-hole 9 in the stud body. For the fixing of the pin in the stud body the latter has a step 6 against which rests a flange 10 of the end of the stud pin facing the tyre centre. The stud body is provided with an upper and a lower flange 7 and 8 respectively for anchoring the stud in the tyre.

The stud according to FIG. 2 has no support plate, so the cushion 3 is thicker and covers the whole part of the hole 9 below the pin. The part of the pin extending above the stud body is surrounded by a conical sleeve 5 of softer material than the rest of the stud, e.g., a plastic.

In an embodiment of the stud (not illustrated) which is especially advantageous as to the ability of self clearing from gravel and other impurities the pin is conically tapered towards its outer end. The hole in the stud body is also conical and is provided with longitudinal grooves which are widening outwards. In this embodiment the pin can be provided with a flange of the type as illustrated by 10 in FIGS. 1 and 2 or can be of a type with no flange.

I claim:

1. An anti-skid tyre stud for vehicle tyres comprising a stud body having a central opening adapted to be axially radially disposed with respect to a tyre;
 a stud pin axially movably mounted within said stud body and having an outer end portion projecting outwardly of said body for contacting a road surface;
 means for retaining said stud pin within said opening; and
 a cushion of elastic material disposed in the inner portion of said opening adjacent to the inner end of said stud pin whereby to afford inward movement of the pin under excessive loads.

2. A tyre stud as set forth in claim 1 wherein said inner end portion of said opening is enlarged with respect to the remainder of said opening;
 said means for retaining said stud pin within said opening comprising a thickened inner end portion on said stud larger than said remainder of said opening.

3. A tyre stud as set forth in claim 1 wherein said stud has a thickened inner end portion adjacent to said cushion;
 means providing a step projecting inwardly of said opening in overlapping relation to said thickened portion of said stud whereby to limit the axial movement of said stud and retain said stud within said body.

4. A tyre stud as set forth in claim 1 wherein said opening in said stud body and said stud pin are conically tapered radially outwardly with respect to a tyre; said opening being provided with longitudinal grooves which widen outwardly with respect to said body.

5. A tyre stud as set forth in claim 1 wherein said body has at least one outwardly projecting flange for retaining said body in a tyre.

6. A tyre stud as set forth in claim 1 wherein said opening comprises a through-hole in said stud body;

a rigid support plate secured within the inner end of said through-hole and providing a rigid backup means under said cushion.

7. A tyre stud as set forth in claim 1 wherein a sleeve of relatively softer material surrounds at least a part of said outwardly projecting end portion of said pin.

8. A tyre stud as set forth in claim 7 wherein said sleeve is outwardly conically tapered.

* * * * *

UNITED STATES PATENT OFFICE
CERTIFICATE OF CORRECTION

Patent No. 3,786,849                     Dated January 22, 1974

Inventor(s) Kaj-Ragnar Loqvist

It is certified that error appears in the above-identified patent and that said Letters Patent are hereby corrected as shown below:

Column 1, line 34, change "coaxial" to ---axial---.

Signed and sealed this 12th day of November 1974.

(SEAL)
Attest:

McCOY M. GIBSON JR.
Attesting Officer

C. MARSHALL DANN
Commissioner of Patents